W. H. Warren,

Shaping Metals.

No. 113,824.  Patented Apr. 18, 1871.

Witnesses
Thos. H. Dodge
Chas. H. Burleigh

Inventor
W. H. Warren

United States Patent Office.

WILLIAM H. WARREN, OF WORCESTER. MASSACHUSETTS, ASSIGNOR TO AURIN WOOD AND JOSEPH F. LIGHT, OF SAME PLACE.

Letters Patent No. 113,824, dated April 18, 1871.

IMPROVEMENT IN SHAPING-MACHINES.

The Schedule referred to in these Letters Patent and making part of the same.

*To all whom it may concern:*

Be it known that I, WILLIAM H. WARREN, of the city and county of Worcester and State of Massachusetts, have invented certain new and useful Improvements in Shaping Machines, of which the following is a full, clear, and exact description, reference being had to the accompanying drawing which forms a part of this specification, in which—

Figure 3 represents a view of the right-hand side; and

Figure 4 represents, upon an enlarged scale, a side view of the adjustable stops.

Figure 1:
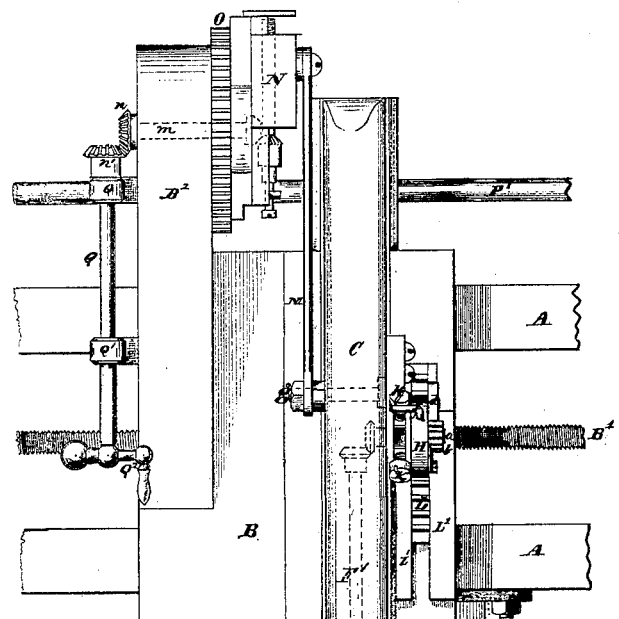
Figure 1 represents a plan view of so much of a shaping-machine as is necessary to illustrate my improvements.

To enable those skilled in the art to which my invention belongs to make and use the same, I will proceed to describe it more in detail.

The nature of my invention consists in certain special improvements in shaping-machines, as hereafter fully described.

In the drawing the parts marked A represent the main frame, upon the top of which is arranged the saddle or carriage B, supported by suitable ways, so that it can be run to the right or left by means of the screw $B^1$ in the ordinary manner.

Upon the carriage B is arranged the reciprocating slide C, which carries the head-block D and tool-rest E.

The slide C is provided with an adjustable circular head, $C^1$, to which the head-block D is united by means of guide-ways D', at the front side of head $C^1$, and upon which the head-block D may be moved up and down by the action of the screw F arranged in an upright position on the head $C^1$, between the ways D'.

Figure 2:
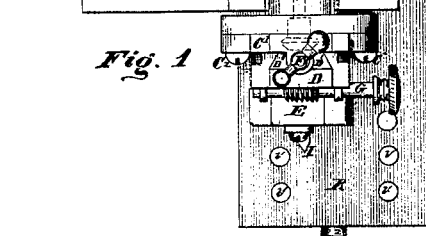
Figure 2 represents a front view.
Figure 2:
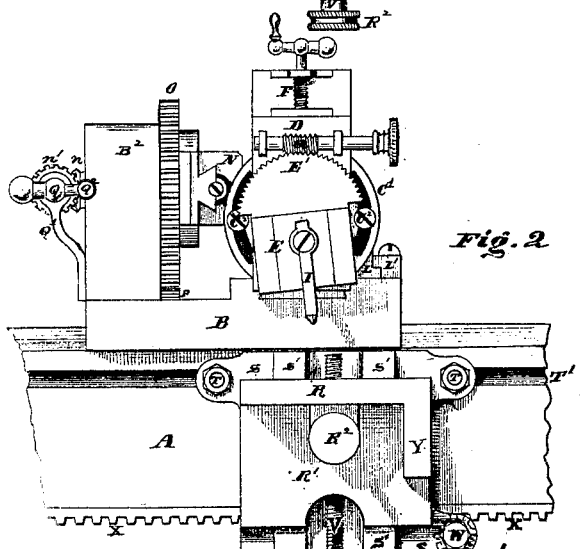

The head $C^1$ is attached to the end of the reciprocating slide C by means of the screws or bolts $C^2$, which pass through segmental slots formed in the head C, as fully shown in fig. 2.

By loosening the bolts or screws $C^2$ the head $C^1$ can be easily turned upon its center, so that the screw F and ways D' will stand in an angular or oblique position.

The screw F is connected for operation, by means of a pair of bevel gears, to a horizontal shaft, F', within the slide C, as indicated by dotted lines in figs. 1 and 3 of the drawing.

The shaft F' is arranged parallel with the axis of the slide C, and the gear upon its front end forms a center, around which the head $C^1$ is swung when moved to an oblique position.

The shaft is actuated by means of an automatic feeding device, as hereafter explained.

The tool-rest E is pivoted to the central part of the head-block D, and is provided with a toothed segment, E', at its upper part, by means of which, in connection with the screw G, the rest E can be swung to the right or left to properly adjust the cutting-tool I.

At the side of the reciprocating slide C is arranged the automatic feeding device for actuating the shaft F', which operates the screw F, and feeds forward the head-block D, which carries the cutting-tool I in a downward or diagonal direction, according to the position of the head $C^1$.

The feeding device consists of a short shaft, $a$, arranged at a right angle to the shaft F', to which it is connected for operation by bevel-gears, the positions of which are indicated by dotted lines in fig. 1.

The outer end of the shaft $a$ is furnished with a ratchet-wheel, $b$, rigidly keyed to its extremity, and a segment-gear, H, which is hung loose on said shaft just inside of the ratchet-wheel.

A dog, $d$, is pivoted to the side of the segment-gear H, which engages with the notches of the ratchet-wheel when the machine is in motion, and thereby moves the shaft $a$.

The shaft $a$ is supported and turns in a crescent-shaped bearing-piece J, which is secured to the side of the reciprocating slide C.

A semicircular slot, $c$, is formed through the bearing piece J, and is also slotted vertically through its upper part.

Arranged in the vertical slot are two stop-screws, K, which screw into nuts K' in the semicircular slot $c$, as shown in fig. 4. By loosening the screws and sliding the nuts along the slot $c$ the stop may be adjusted to different positions when desired.

A pin or finger, $f$, is set in the top of the segment-gear H, which strikes the stops K and stops the motion of the gear H.

Instead of using screws for the stops K lugs may be secured to the top of the bearing-piece J, the ends of which will project over the edge of the segment-gear H, in which case the finger $f$ could be made quite short.

The segment-gear H meshes into and is operated by a rack, L, arranged upon the carriage B, as indicated.

The rack L is supported between guides L', and it is subjected to sufficient friction to enable it to turn the segment-gear H until the finger comes into contact with one of the stop-screws K, after which the rack L is caused to slide along between the guides L' with the motion of the slide C.

The reciprocating slide C is moved back and forth by a pitman, M, actuated by an adjustable crank device, N, which device is made in accordance with my invention, for which Letters Patent were granted to me January 14, 1868.

The forward end of the pitman M is secured by a pivot-bolt, $g$, in a longitudinal slot, $h$, formed through the slide C, as shown in fig. 3, whereby it can readily be adjusted to different positions when desired.

The crank device N is attached to the side of a large gear, O, which meshes into and is operated by a pinion, P, on the driving-shaft P', at the back of the machine.

The crank device N and gear O are supported by a projecting portion, $B^2$, of the carriage B.

The spindle $m$, by which the crank is automatically adjusted, extends through the bearing-block $B^2$, and is provided at its end with a miter or beveled gear, $n$, which meshes with a similar gear, $n'$, on the rear end of a transverse shaft, Q, arranged in the bearings $Q^1$, at the side of the carriage B, as shown in figs. 1 and 2.

The shaft Q is furnished with a hand-crank, $Q^2$, at its front end, by means of which the operator is enabled to adjust the crank device N in a very convenient and perfect manner without stopping the machine.

At the front of the main frame A is arranged the work-supporting table, R, the back $R^1$ of which is grooved and fitted to the ways S', upon a vertical carriage, S, which latter is secured to the front part of the frame A by means of clamp-bolts T, the heads of which are fitted into and held in a longitudinal groove, $T^1$, formed in the frame, as indicated.

The table R can be conveniently raised or depressed by means of an adjusting-screw, V, arranged in a vertical position between the ways S', and upon which is a bevel-gear nut, $V^1$, to which the table is secured, and which can be operated by means of a hand-wheel or crank, $R^2$, on the front end of a shaft which extends from the front of the table back to the screw V, where it is provided with a miter or bevel-gear, which meshes into the gear of nut $V^1$, as fully indicated in dotted lines, fig. 3.

The hand-wheel $R^2$ and shaft $V^2$ enable the operator to raise or lower the table in a very easy and convenient manner without the trouble of stooping and reaching beneath the machine, as he is required to do with machines of the ordinary construction.

Arranged at the lower part of the vertical carriage S is a spindle or bolt, W, which passes through the carriage-frame, and is provided at its rear end with a pinion, W', which meshes with a rack, X, on the lower edge of the main frame A.

By placing a wrench upon the head of the bolt or spindle W, and turning the pinion W', the carriage S and table R can be easily run along the front of the machine to bring it into any desired position, and when properly adjusted it can be firmly secured in such position by turning up the nuts upon the clamp-bolts T.

The table R is formed with a downward return, Y, at one side, to which to secure pieces of work that cannot be conveniently placed in the right position upon the horizontal portion R.

Holes $v$ are formed in the top R and side Y of the table to facilitate the securing of the work in position.

The operation of my machine is as follows:

The work is secured to the table R in the desired position and the cutting-tool I properly adjusted, the head C being set in either an upright or inclined position, as best to suit the requirements of the work.

Power now being applied to the machine the slide C is caused to move back and forth by the action of the crank N and pitman M, thereby carrying the cutting-tool back and forth over the work. As the slide C moves to the front the segment-gear H is caused to roll forward, carrying the dog $d$ over the ratchet $b$, until the finger $f$ strikes the front stop-screw K, which prevents its further motion, and causes it to overcome the friction and to slide forward the rack L throughout the remainder of the distance traversed by the slide C. As the slide C moves backward, the spring $c$ causes the dog $d$ to engage the ratchet $b$, and as the segment-gear H is rolled back the shaft $a$ is revolved and actuates the shaft F' within the slide C, which latter transmits motion to the screw F, and thereby feeds down the head-block D and cutting-tool I either in a vertical or diagonal direction, according to the way in which the head $C^1$ is set.

When the segment-gear H has rolled back sufficiently far to bring the finger $f$ in contact with the rear stop-screw K, its motion is stopped and the rack L caused to slide for the remainder of the distance, as before.

It will be observed that my feeding device will act with equal facility whether the head $C^1$ is in an upright or inclined position, thus rendering the machine of great utility and convenience.

The feeding-screw F can also be operated by hand when desired by throwing the dog $d$ out of clutch with the ratchet-wheel $b$, and turning the screw by means of the crank at its upper end.

The friction may be applied to the rack L in any convenient manner; or, if preferred, the segment-gear H can be made in the form of smooth-faced roll, and the friction be applied directly to its face.

I prefer, however, the form shown in the drawing.

Having described my improved shaping-machine, What I claim therein as new and of my invention, and desire to secure by Letters Patent, is—

1. The combination, with the reciprocating slide C and head-block D, which carries the cutting-tool, of the automatic feeding device, consisting of the parts F F', $a$, $b$, H, $d$, J, K, $f$, L, and L', arranged in relation to each other, substantially as shown and for the purposes set forth.

2. The combination, with frame A, of the table R Y $R^1$, vertical slide S, feed-screw V, shaft $V^2$, pinions $V^1$, rack X, and pinion W', constructed and arranged for operation substantially as and for the purposes set forth.

3. The improved machine herein described, consisting essentially of the adjustable crank device N, pitman M, slide C, with its cutting-tool and automatic tool-feeding devices, all arranged and operating substantially as described.

W. H. WARREN.

Witnesses:
 THOS. H. DODGE,
 CHAS. H. BURLEIGH.